United States Patent [19]

Klann

[11] 4,111,551
[45] Sep. 5, 1978

[54] PHOTOGRAPHIC DISTORTION APPARATUS

[76] Inventor: Paul A. Klann, 301 4th St., Waynesboro, Va. 22980

[21] Appl. No.: 686,478

[22] Filed: May 14, 1976

[51] Int. Cl.² .......................................... G03B 27/10
[52] U.S. Cl. ...................................... 355/84; 355/52
[58] Field of Search ................... 355/84, 52, 103, 78; 74/192, 193

[56] References Cited

U.S. PATENT DOCUMENTS

| | | | |
|---|---|---|---|
| 760,460 | 5/1904 | Leighton | 74/192 |
| 856,846 | 6/1907 | Cole | 74/192 |
| 3,115,081 | 12/1963 | Bruce | 355/103 |
| 3,126,809 | 3/1964 | Adams et al. | 355/78 |
| 3,374,724 | 3/1968 | Torres | 355/84 |
| 3,445,165 | 5/1969 | Dubbs | 355/84 |
| 3,861,797 | 1/1975 | Nishida et al. | 355/52 |
| 3,967,898 | 7/1976 | Klann | 355/52 X |
| 3,992,094 | 11/1976 | Adcock | 355/84 |

*Primary Examiner*—Richard L. Moses
*Attorney, Agent, or Firm*—Spensley, Horn & Lubitz

[57] ABSTRACT

An apparatus for producing from a photographic transparency a contact copy that is controllably elongated or compressed in one dimension only. The transparency and a photosensitive film sheet are separately transported at different linear speeds past an elongated illuminated slit by a pair of drive rollers that are driven at different rotational rates. Segmented pressure rollers keep the transparency and film sheet in contact with their respective drive rollers during transport.

A differential speed drive mechanism is used to rotate the drive rollers at different speeds. This comprises a pair of complementarily tapered shafts, coaxially attached to the respective drive rollers, together with an O-ring that is caught between the shafts at a selectable axial location. The ratio of the tapered shaft diameters at the location of the O-ring establishes the relative rotation rate of the drive rollers, and hence the extent of dimensional distortion of the produced copy. This can be varied continuously by moving the O-ring axially with respect to the tapered shafts, and this is accomplished by means of a movable carriage assembly that supports the O-ring.

8 Claims, 7 Drawing Figures

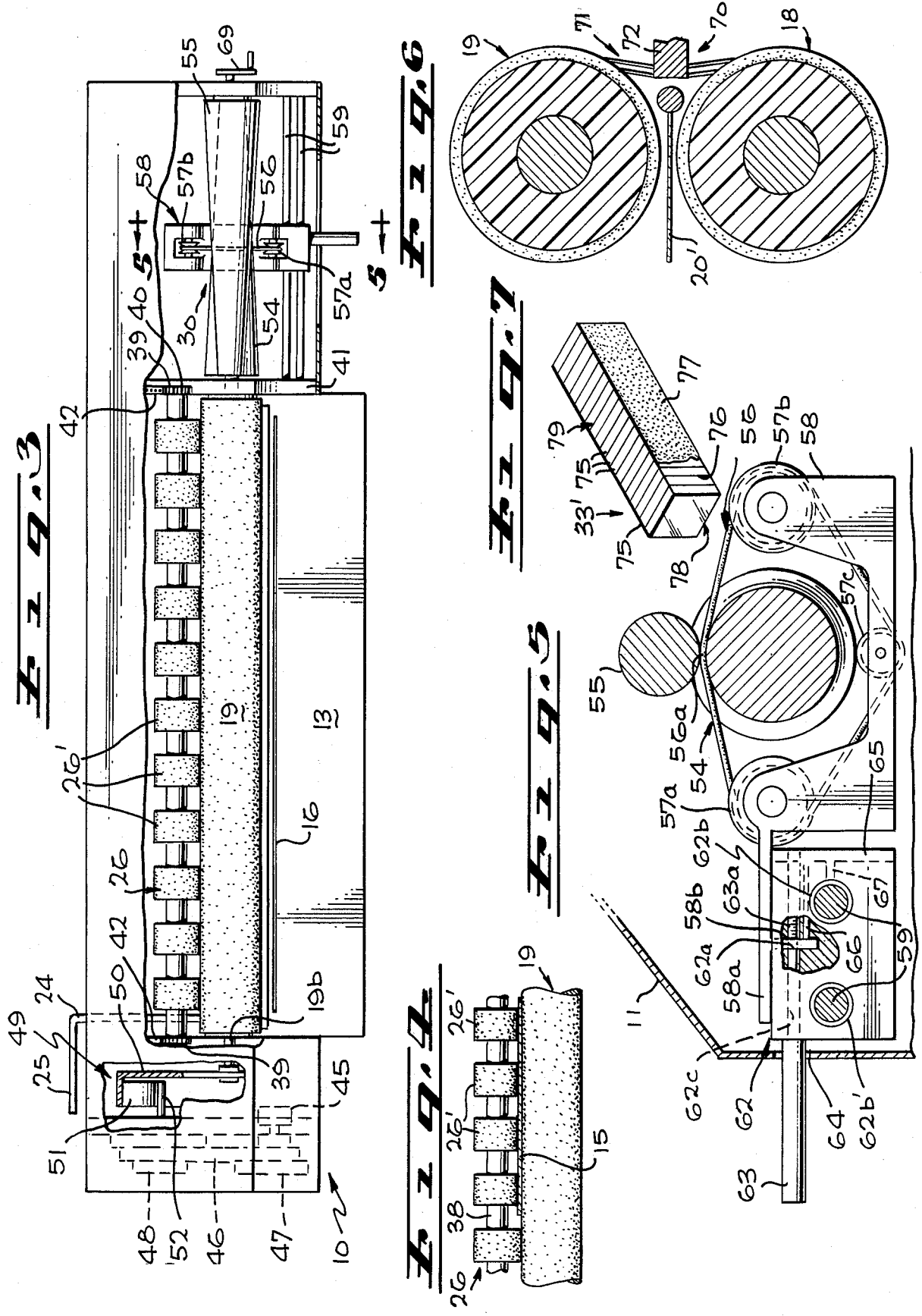

PHOTOGRAPHIC DISTORTION APPARATUS

BACKGROUND OF THE INVENTION

1. Field of the Invention

The present invention relates to a photographic distortion apparatus for producing a contact copy of a photographic transparency, the copy being shortened or lengthened in one dimension only while the other dimension remains unchanged.

2. Description of the Prior Art

For various applications, it is desirable to alter only one, but not the other dimension of an image. For example, a newspaper might receive an advertising layout which is the correct column width, but is shorter than the intended or available space in the newspaper column. Normal photographic enlargement of the advertisement is not helpful, since this would result in a layout that is the correct length but too wide for the column. In the past, this situation may have required a completely new advertising layout, with concomitantly high cost. An object of the present invention is to provide a photographic distortion apparatus that is useful in such situations to provide a contact copy of a photographic film image in which one dimension of the copy is shortened or lengthened while the other dimension remains unchanged.

Certain photographic distortion devices have been proposed. For example, the photo-composing apparatus shown in the U.S. Pat. No. 3,401,616 to Cross facilitates both single dimension compression of elongation, as well as tilting or other distortion of the original image. The apparatus employs a linearly movable work table that holds the design negative. The table moves on rails past a light source that is projected through a long narrow slit which extends across the work surface of the table. A complex linkage including a swing arm and a slide bar is used to move a photographic film past the light slit, underneath the design negative, at a rate of travel that is different from the negative. As a result, a contact copy is formed that is distorted in accordance with the differential speeds and directions at which the design negative and film are moved past the light slit.

Photographic distortion in one dimension only also is accomplished using the device disclosed in the U.S. Pat. No. 3,445,165 to Dubbs. There, two separate movable mounting frames are used respectively to support the photographic image that is being reproduced and the photosensitive film. Independent drive mechanisms transport the two mounting frames past an illuminated slit at different rates.

Another object of the present invention is to provide a photographic distortion apparatus of simple mechanical design, which does not require mounting tables of frames, nor separate linkages to achieve differential rates of travel for the photographic transparency and film. Thus, an object of the present invention is to provide a mechanically simple distortion apparatus.

A similar objective was achieved by the inventor's Optical Distortion Device which is the subject of U.S. pat. application Ser. No. 523,927, now U.S. Pat. No. 3,967,898. There, the leading edges of the photographic transparency and of the photosensitive sheet respectively were attached to a pair of cylindrical rollers rotatably mounted within a light-proof box. The rollers were driven at different rotational rates by a pair of variable speed synchronous motors. Electrical control was used to vary the speed of one motor with respect to the other so as to control the roller rotation rates, and hence to control the difference in linear speeds at which the transparency and the photosensitive sheet were pulled past a narrow light slit. Unidimensional lengthening or shortening was achieved.

The inventor's aforementioned Optical Distortion Device has the advantage of permitting continuous control over the relative speeds past the slit, and hence of the extent of image enlargement or compression. Another object of the present invention is to provide a photographic distortion apparatus having a simplified mechanical means for achieving such continuous control over the extent of image expansion or compression. Another objective is to provide an apparatus in which the photographic transparency and the film sheet are not attached to the drive rollers, but rather are simply inserted into the apparatus and driven therethrough as the dimension-modified copy is made. The apparatus thus features simplicity of operation.

SUMMARY OF THE INVENTION

In accordance with the present invention, these and other objectives are achieved by providing a photographic distortion apparatus having a pair of spaced parallel drive rollers that are used to transport a photographic transparency and a film sheet past an elongated, illuminated slit. A pressure roller is associated with each drive roller. An insertion guide directs the transparency and film sheet into contact with their respective drive rollers, and the pressure rollers serve to maintain this contact during transport through the apparatus. Advantageously, the pressure rollers are segmented to ensure that a consistent travel rate is imparted to the transparency and film sheet.

The extent of image compression or elongation can be varied continuously by means of a differential speed drive mechanism that interconnects the drive rollers. This mechanism utilizes a pair of complementarily tapered shafts that are coaxially attached to the respective drive rollers. A rotational transmission means interconnects the tapered shafts at a selectable position along the axis of the shafts. A motor and rim driven drum mechanism impart rotation to one drive roller and the associated tapered shaft. This rotation is transmitted to the other tapered shaft and drive roller at a rate determined by the linear position of the transmission means that interconnects the tapered shafts.

Advantageously, this transmission means comprises an O-ring or band of material mounted to rotate about a set of idler pulleys. A portion of the O-ring is clamped between the tapered shafts. The pulleys themselves are mounted on a carriage which can be positioned linearly with respect to the axis of the tapered shafts so as to provide differential speed selection. In this manner, relocation of the carriage and O-ring facilitates selection of the extent of compression or elongation of the produced contact copy.

BRIEF DESCRIPTION OF THE DRAWINGS

A detailed description of the invention will be made with reference to the accompanying drawings wherein like numerals designate corresponding parts in the several figures.

FIG. 3 is a top view of the distortion apparatus of FIG. 1, partly broken away to show the mechanism for rotating the transparency and film drive rollers at different rates.

FIG. 4 is a fragmentary top view of the pressure roller used to hold the film sheet against its drive roller during transport of the sheet.

FIG. 5 is a transverse sectional view along the line 5—5 of FIG. 3, showing details of the differential speed drive mechanism.

FIG. 6 is a transverse sectional view like FIG. 2, but showing an alternative means for holding the photographic transparency and the film shet against their respective drive rollers.

FIG. 7 is a pictorial view of a light collimator useful in the distortion apparatus of FIG. 1.

DESCRIPTION OF THE PREFERRED EMBODIMENTS

The following detailed description is of the best presently contemplated modes of carrying out the invention. This description is not to be taken in a limiting sense, but is made merely for the purpose of illustrating the general principles of the invention since the scope of the invention is best defined by the appended claims.

Operational characteristics attributed to forms of the invention first described also shall be attributed to forms later described, unless such characteristics obviously are inapplicable or unless specific exception is made.

Figure 1:
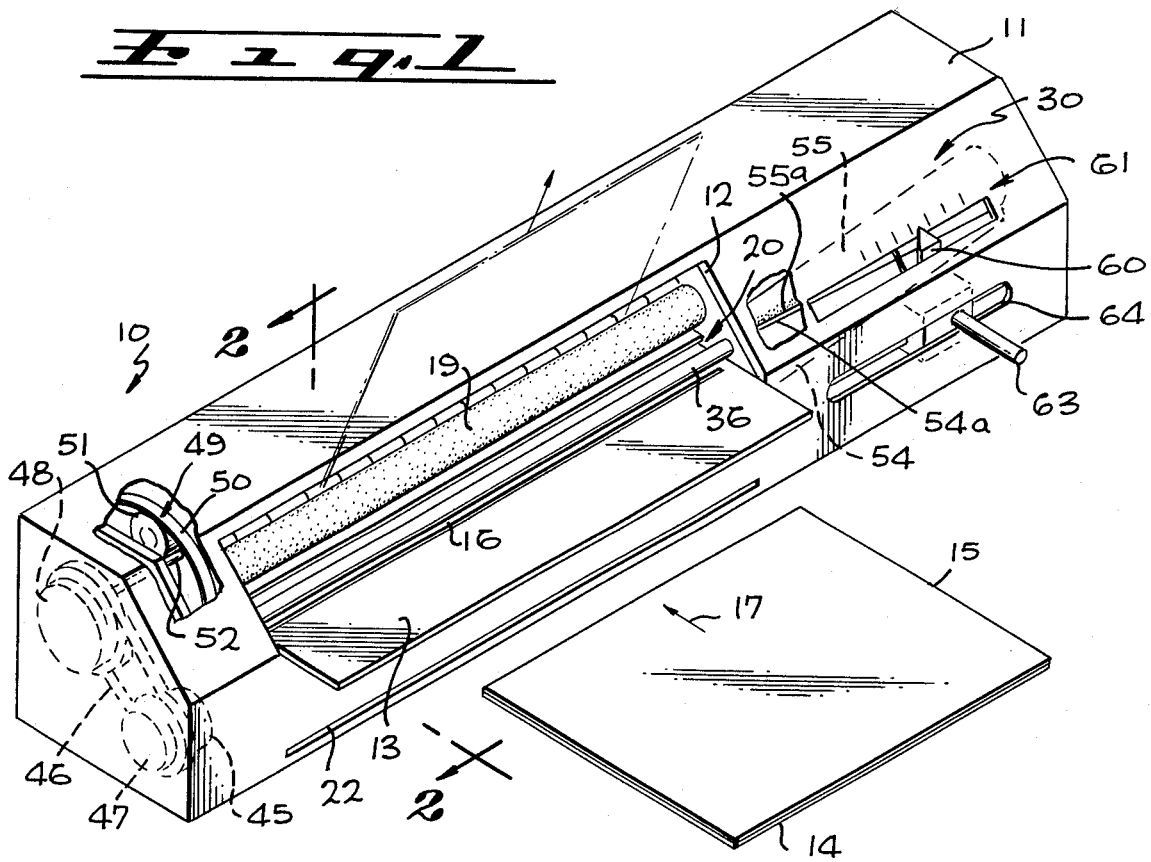
FIG. 1 is a pictorial view of a distortion apparatus in accordance with the present invention.
Figure 2:
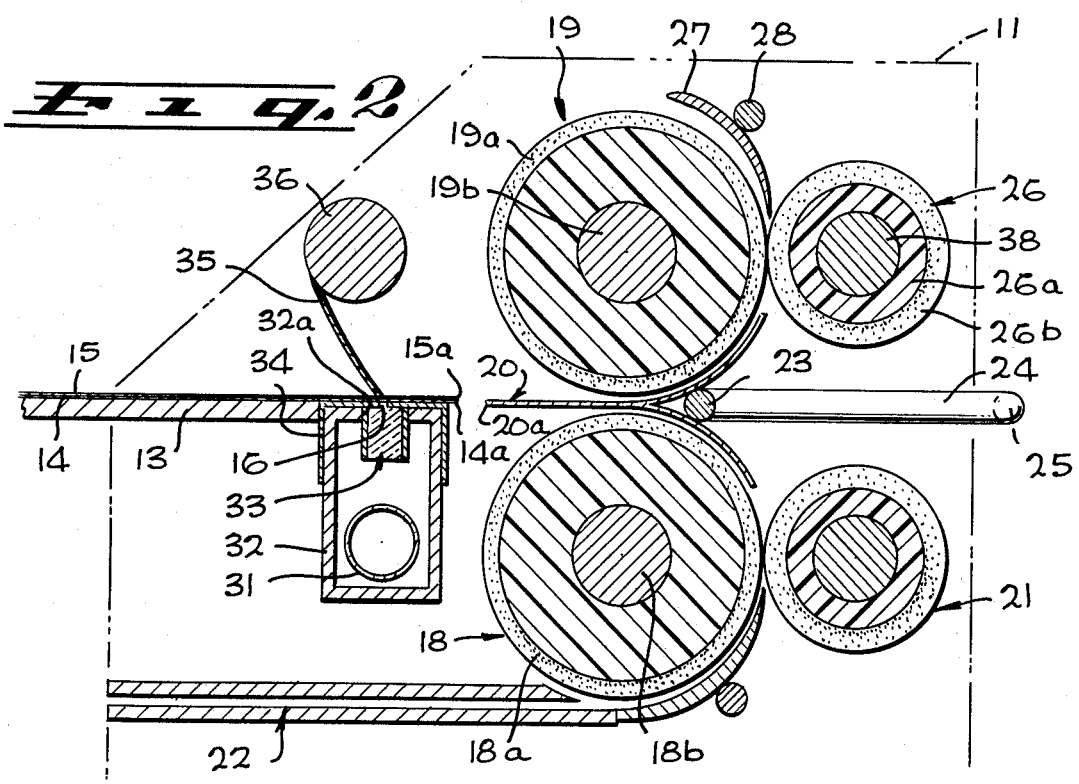
FIG. 2 is a transverse sectional view of the distortion apparatus of FIG. 1 as viewed along the line 2—2 thereof. This view shows the rollers respectively used to transport the photographic transparency and the film sheet past an illuminated slit at differential rates so as to produce a contact copy that is lengthened or shortened in one dimension.

Referring to FIGS. 1, 2 and 3, the inventive distortion apparatus 10 is contained in a housing 11 having a frontal opening 12. Projecting forwardly from this opening 12 is a horizontal plate 13 that provides support for a photographic transparency 14 and a film sheet 15 as they are transported past an elongated light slit 16 at different speeds. The film sheet 15 is exposed by light from the slit 16 passing through the transparency 14. Since the film sheet 15 is moving past the slit 16 either faster or slower than the transparency 14, the resultant contact copy produced when the film sheet 15 is developed is either shorter or longer than the original image on the transparency 14. This dimensional change in image size occurs only in one direction, that being the direction of linear travel past the slit 16, as indicated by the arrow 17.

The transparency 14 and the film sheet 15 are transported through the apparatus 10 by respective drive rollers 18 and 19 (FIG. 2). The leading edge 14a of the transparency 14 first is inserted beneath an elongated arcuate guide 20 which directs the transparency around the rear of the drive roller 18 into contact with a pressure roller 21. As described below in connection with FIGS. 3 and 4, this pressure roller 21 biases the transparency 14 against the relatively high friction outer coating 18a of the roller 18, so that rotation of the roller 18 will drive the transparency 14 through the apparatus 10 and out via an exit chute 22. During each transparency insertion, the front edge 20a of the guide 20 may be raised by pivoting the guide 20 about an axial support rod 23. A lever 24 and associated handle 25 are attached to the rod 23 to facilitate external upward or downward tilting of the guide 20.

To insert the film sheet 15, the front edge 20a of the guide 20 is tilted downward and the film leading edge 15a is directed upwardly by the guide 20 around the rear of the drive roller 19 into contact with a pressure roller 26. This holds the film sheet 15 against the relatively high friction cladding 19a of the roller 19, rotation of which drives the film sheet 15 through the apparatus 10. An elongated arcuate guide 27, fixedly supported by a mounting rod 28, directs the film sheet 15 out of the apparatus 10 through the top of the frontal opening 12.

The rollers 18 and 19 are rotated at different rates by a differential speed drive mechanism 30 described below in connection with FIGS. 1, 3 and 5. As a result, the photographic transparency 14 is pulled past the illuminated slit 16 at a different rate than the film sheet 15. During such passage, the film sheet 15 is exposed to light supplied from a small diameter elongated lamp 31 contained in a light-tight housing 32. A collimator 33 is mounted in an elongated opening 32a at the top of the housing 32, and directs the light to the slit 16. The slit 16 advantageously comprises a transparent stripe defined photographically in an otherwise opaque film 34. The upper surface of the housing 32 holding the slit film 34 is flush with the feed support plate 13. An elongated leaf spring 35, supported by a rod 36, holds the film sheet 15 and the photographic transparency 14 against the slit 16.

The pressure rollers 21 and 26 are identical. As shown in FIGS. 3 and 4, the roller 26 has a rigid shaft 38 the ends of which are journalled in bearings 39 that are mounted in slots 40 in a frame 41 within the housing 11. Springs 42 bias the bearings 39 and hence the shaft 38 and roller 26 against the drive roller 19.

Spaced along the shaft 38 are a plurality of roller segments 26'. Each comprises an annular self-lubricating bearing 26a of nylon or like material. This is covered with an outer layer 26b of soft resilient material such as closed cell neoprene rubber or soft sponge rubber.

When the film sheet 15 is disposed between the pressure roller 26 and the drive roller 19 as shown in FIG. 4, the outer layers 26b of the roller segments 26' in contact with the sheet 15 are compressed slightly, thereby providing a uniform pressure on the sheet 15 over its entire width. This ensures that the film sheet 15 will be transported at a constant rate determined by the rotational speed of the drive roller 19. If a non-segmented pressure roller were used, and the film sheet 15 were not as wide as the drive roller 19, the surface of the pressure roller would form a "V" with the surface of the drive roller 19. The edge of the film sheet 15 caught at the narrow portion of the "V" would be firmly pressed against the drive roller 19, while the remainder of the film sheet 15, because of its situation within the wider portion of the "V" would be less firmly pressed against the pressure roller 19. As a result, slippage, twisting or non-uniform drive speed of the film sheet 15 through the apparatus 10 would result. All of these problems are eliminated by use of the segmented pressure rollers 21 and 26 disclosed herein.

The drive roller 19 is driven by a motor 45 (FIGS. 1 and 3) connected via a belt 46 and a pair of pulleys 47, 48 to a drive mechanism 49 similar to that of a phonograph. This includes a drum 50 coaxially affixed to the shaft 19b of the driver roller 19. The drum 50 is rim-driven by an idler wheel 51 which itself is driver by a small diameter shaft 52 attached to the pulley 48. This arrangement provides a very smooth, uniform rotation rate to the drive shaft 19, free of any speed variation that might occur if gears were used in the drive train. The use of a friction drive 49 thus is beneficial to prevent the introduction of "lines" or fluctuations in uniformity of dimensional change in the produced contact copy which might result as a result of "beating" due to gear errors in a gear drive.

Rotational motion is imparted to the drive roller 18 from the roller 19 via the differential speed drive mechanism 30 (FIGS. 1, 3 and 5). This includes a pair of complementarily tapered shafts 54, 55 connected respectively to the shafts 18b and 19b of the drive rollers 18 and 19. Advantageously, the tapered shafts 54, 55 are of identical truncated conical shape, one tapering to the left and the other tapering to the right. In this manner, the opposed tapered shaft edges 54a, 55a are parallel. The tapered shaft 55 is driven by the motor 45 via the friction drive mechanism 49 and the roller shaft 19b.

Rotational motion is transmitted from the tapered shaft 55 to the other tapered shaft 54 (and thence to the roller 18) by an O-ring 56 (FIGS. 3 and 5) a portion 56a of which is caught between the tapered shafts 54 and 55. The O-ring 56 is mounted for rotation on three pulleys 57a, 57b, 57c that are held on a carriage 58. As the drive roller 19 and tapered shaft 55 move counterclockwise as viewed in FIG. 5, the O-ring 56 moves about the pulleys 57a–57c in the clockwise direction, thereby imparting clockwise rotation to the tapered shaft 54 and the drive roller 18.

The relative rotation rates of the drive shafts 18 and 19 is determined by the ratio of diameters of the tapered shafts 54 and 55 at the axial location of the O-ring 56. This may be altered by moving the carriage 58 linearly along a pair of support shafts 59 that are mounted to the frame 41 parallel to the axes of the tapered shafts 54, 55. When the carriage 58 is situated toward the left as viewed in FIGS. 1 and 3, where the diameter of the tapered shaft 55 is smaller than the shaft 54 diameter, the drive roller 18 will rotate more slowly than the drive roller 19. As a result, the film sheet 15 will be transported past the slit 16 at a faster rate than the photographic transparency 14, so that the resultant contact copy will be "stretched" or increased in length. Conversely, when the carriage 58 is positioned toward the right end of the support shaft 59, where the tapered shaft 55 has a larger diameter then the shaft 54, the drive shaft 19 will rotate more slowly than the drive shaft 18. As a result, the film sheet 15 will move past the slit 16 more slowly than the photographic transparency 14, resulting in a reduction in image length. When the carriage 58 is situated at the center of the shafts 59, where the diameters of the tapered shafts 54 and 55 are the same, the resultant image size will be the same as that of the original photographic transparency 14. A pointer 60 (FIG. 1) attached to the carriage 58 cooperates with a scale 61 on the front of the housing 11 to indicate the axial position of the O-ring 56. This scale 61 may be calibrated to indicate directly the extent of image enlargement or reduction.

Additional details of the carriage 58 are shown in FIG. 5. The carriage includes a forwardly projecting plate 58a having a depending peg 58b that projects into a hole 62a in a block 62. The support shafts 59 extend through parallel holes 62b and 62b' in the block 62. A knob or handle 63 projects through an elongated slot 64 in the front of the housing 11 and includes a threaded shaft 63a that extends through a transverse hole 62c in the block 62 into a threaded hole in a plate 65 at the rear of the block 62. A pair of transverse pins 66, 67 extend from the plate 65 through respective holes in the block 62 into contact with the peg 58b and the rear support shaft 59. In this manner, when the handle 63 is rotated so as to tighten the plate 65 against the block 62, the pin 67 locks the block 62 to the shaft 59 so as to prevent sliding motion along the support shaft 59, and the pin 66 is locked against the peg 58 b so as to prevent pivotal motion of the carriage 58.

To change the carriage 58 location, and hence to change the extent of image enlargement or reduction, the handle 63 is turned so as to loosen the plate 65. Using the handle 63, the block 62 then is moved linearly along the suppport rods 59. This pulls the carriage 58 in the same direction. Since a portion of the O-ring 56 is caught between te tapered shaft 54 and 55, the carriage 58 will not easily move unless these shafts 54, 55 are rotated. The motor 45 can be used for this purpose, but faster movement is achieved by rotating the shafts 54, 55 manually. This is facilitated by a crank 69 (FIG. 3) attached to the tapered shaft 55 and projecting from the right end of the housing 11. Since the plate 65 is loosened, the carriage 58 and its forwardly projecting plate 58a are free to pivot about the peg 58b. In this way, the plane of O-ring 56 can be angled with respect to the axes of the shafts 54, 55. Thus, as the crank 69 is turned and the block 62 is moved linearly along the support shaft 59 by means of the handle 63, the O-ring 56 will gradually be moved along the shafts 54, 55 to the new position. There, the plane of the O-ring 56 can be aligned perpendicular to the axes of the shafts 54, 55 and the handle 63 rotated to tighten the plate 65 and thereby lock the carriage 58 in place.

In the alternative embodiment of FIG. 6, the pressure rollers 21 and 26 are not used. Instead, two sets 70, 71 of leaf springs, mounted to a common support 72, are used respectively to hold the photographic transparency 14 against the drive roller 18 and the film sheet against the drive roller 19. A simplified planar insertion guide 20' is employed which does not have curled rear sections. These are not necessary, since the leaf springs 70, 71 themselves bend the transparency 14 and film sheet 15 toward the respective rollers 18 and 19 during insertion.

FIG. 7 shows a form of light collimator 33' that may be used with the distortion apparatus 10. This consists of a plurality of individual transparent blocks 75. The contiguous faces 76 between adjacent blocks 75 may be held together by an adhesive. Alternatively, the blocks 75 may be held together by opaque strips 77 along parallel sides of the collimator 33'. When light from an elongated source such as the lamp 31 impinges on the underside 78 of the collimater 33', the light will be transmitted through to the top 79. However, those light rays which impinge on the bottom 78 at an angle will not go directly through the collimater 33', but will be internally reflected by the interfaces 76. The result is that the light rays leaving the collimater 33' from the upper surface 79 will be in generally parallel alignment.

Intending to claim all novel, useful and unobvious features, shown or described, the inventor claims:

1. A photographic distortion apparatus for producing on a photographic film sheet a contact copy of a photographic transparency that is modified in dimemsion along one axis only, comprising:
 a pair of drive rollers facing each other in spaced parallel relationship,
 pressure means for holding said transparency against one of said drive rollers during rotation thereof and for holding said film sheet against the other of said drive rollers during rotation thereof, said pressure means selected from the group consisting of:
(a) a pair of pressure rollers each associated with a respective drive roller, each pressure roller having a rigid shaft mounted in spaced parallel relationship to said respective drive roller and biased theretoward, and a plurality of annular roller sections mounted on said shaft, each roller section including an annular bearing portion surrounded by an annular resilient layer, and
(b) one or more elongated leaf springs pressing against each of said drive rollers, illuminated slit means situated adjacent said drive rollers, for providing an elongated strip of light to expose said film sheet through said transparency, and differential speed drive means for revolving said drive rollers at different speeds, so that said film sheet is moved past said illuminated slit means at a rate different from said transparency, said differential speed drive means comprising;

first and second complementarily tapered shafts facing each other with spaced parallel axes and situated adjacent one end of said drive rollers, the small end of one tapered shaft and the large end of the other tapered shaft being directly attached to a respective one end of said pair of drive rollers, motor means for rotationally driving a first of said drive rollers and the associated tapered shaft, and rotational transmission means interconnecting said complementarily tapered shafts at a selectable position axial thereof, rotation of said associated tapered shaft being transmitted to the other tapered shaft and thence to the second drive roller via said transmission means, the axial location of said transmission means determining the relative rotational speeds of said two drive rollers and hence the extent of dimensional modification along said one axis of said copy.

2. A distortion apparatus according to claim 1 wherein said rotational transmission means comprises an O-ring in contact with both of said complementarily tapered shafts, said O-ring being mounted for rotation about a set of idler pulleys, rotation of said associated tapered shaft imparting rotation to said O-ring and thence to said other tapered shaft.

3. A distortion apparatus according to claim 2 wherein a section of said O-ring is caught between said complementarily tapered shafts.

4. A distortion apparatus according to claim 2 wherein said O-ring mounting idler pulleys are supported on a carriage, together with means for moving said carriage and hence said O-ring axially with respect to said tapered shafts.

5. A distortion apparatus according to claim 4 further comprising a carriage support rod fixedly mounted in spaced parallel alignment with the axes of said tapered shafts, and wherein said carriage is releasably, pivotally attached to a block that is positionably mounted to said support rod.

6. A distortion apparatus according to claim 1 wherein motor means comprises:
a motor,
a drum fixedly coaxially attached to said first drive roller, and
a gearless rim drive for imparting rotational motion from said motor to the rim of said drum.

7. A distortion apparatus according to claim 1 wherein said illuminated slit means comprises an elongated light-tight housing, an elongated light source within said housing, an elongated light collimator along a longitudinal opening in said housing, and a narrow slit defined photographically as a transparent stripe in a developed photographic film that is otherwise opaque, said slit-contining film being mounted on said collimator so that light from said source will be transmitted out of said housing via said collimator and said slit.

8. A distortion apparatus according to claim 7 wherein said collimator comprises a plurality of transparent blocks with abutting adjacent faces held together in an elongated assembly, light being transmitted directly through individual blocks but not obliquely through the interface between adjacent blocks.

* * * * *